United States Patent
Treiber et al.

(10) Patent No.: US 7,223,478 B2
(45) Date of Patent: May 29, 2007

(54) AQUEOUS POLYURETHANE PREPARATIONS

(75) Inventors: Reinhard Treiber, Leimen (DE); Karl Haeberle, Speyer (DE); Klaus Dieter Hoerner, Mannheim (DE); Rudolf Bingemann, Fussgoenheim (DE); Bruno Hofer, Ludwigshafen (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 71 days.

(21) Appl. No.: 10/511,596

(22) PCT Filed: May 2, 2003

(86) PCT No.: PCT/EP03/04604

§ 371 (c)(1),
(2), (4) Date: Nov. 2, 2004

(87) PCT Pub. No.: WO03/095517

PCT Pub. Date: Nov. 20, 2003

(65) Prior Publication Data

US 2005/0209425 A1    Sep. 22, 2005

(30) Foreign Application Priority Data

May 13, 2002  (DE)  ................. 102 21 220

(51) Int. Cl.
*B05D 3/00* (2006.01)
*B05D 3/02* (2006.01)
*B05D 3/12* (2006.01)
*B32B 27/00* (2006.01)
*B32B 27/40* (2006.01)

(52) U.S. Cl. ................. 428/423.4; 427/372.2; 427/385.5; 427/323; 427/389; 428/423.1; 524/589; 524/590; 524/591; 524/839; 524/840

(58) Field of Classification Search ............... 524/589, 524/590, 591, 839, 840; 427/385.5, 372.2, 427/323, 389; 428/423.1, 423.4, 425.1, 425.8, 428/425.6; 442/43, 58, 281
See application file for complete search history.

(56) References Cited

U.S. PATENT DOCUMENTS

| 3,033,825 | A | * | 5/1962 | Murphy ................. 528/57 |
| 4,046,729 | A | * | 9/1977 | Scriven et al. ............ 524/589 |
| 4,147,679 | A | * | 4/1979 | Scriven et al. ............ 523/404 |
| 5,264,572 | A | * | 11/1993 | Endo et al. ................ 544/193 |
| 5,610,232 | A |   | 3/1997 | Duan et al. |

FOREIGN PATENT DOCUMENTS

| DE | 40 16 713 | 11/1991 |
| DE | 40 17 525 | 12/1991 |
| EP | 0 204 938 | 12/1986 |
| EP | 1 072 652 | 1/2001 |

* cited by examiner

*Primary Examiner*—Patrick D. Niland
(74) *Attorney, Agent, or Firm*—Oblon, Spivak, McClelland, Maier & Neustadt, P.C.

(57) ABSTRACT

Aqueous polyurethane formulations, their use and substrates which are coated with such formulations are described.

18 Claims, No Drawings

AQUEOUS POLYURETHANE PREPARATIONS

The polyurethane dispersions used for coating substrates, e.g. wood, metal, plastic, textiles or leather, generally give highly glossy polymer films.

In some applications, for example in the coating of automotive leathers and upholstery leathers, however, coatings having very low gloss are required. This low gloss should not change even as a result of rubbing, as occurs during use, i.e. the coating should be polishable to a very small extent. Moreover, the coating should not cause any change in the hue of the substrate; for example, the coating should not make a black leather appear gray.

DE-A1 4 016 713 describes mixtures of polymer dispersions which are film-forming below 70° C. with polyurethane-polyurea dispersions which are not film-forming below 70° C. for the production of dull coatings. A disadvantage of these mixtures is that two different dispersions have to be provided for their preparation, which means greater expense with regard to synthesis.

DE-A1 4 017 525 describes aqueous polyurethane formulations which contain a polyurethane which is obtained from at least one diisocyanate having no lateral groups and at least one diisocyanate having at least one lateral group. However, the coatings which are obtained with these dispersions no longer meet present day requirements with regard to polishability. Furthermore, the dispersions thus obtainable have stability problems.

It is an object of the present invention to provide polyurethane dispersions which meet the following requirements:
- coatings obtained therefrom should have very low gloss.
- the gloss should not change substantially as a result of rubbing (no polishability).
- the coating should not substantially change the hue of the substrate.
- said properties should be obtained by using a single polyurethane dispersion.
- leathers treated with the polyurethane dispersions should have good mechanical properties.

We have found that this object is achieved by aqueous polyurethane formulations comprising from 10 to 60% by weight of at least one polyurethane A which is composed of
a) at least one organic isocyanate having no lateral alkyl groups [monomers I],
b) if required, at least one organic isocyanate having at least one lateral alkyl group [monomers II],
c) at least one dihydric or polyhydric alcohol having a number average molecular weight of from 400 to 6 000 [monomers III],
d) at least one dihydric or polyhydric alcohol having a number average molecular weight of from 62 to 399 [monomers IV],
e) at least one carboxylic acid having at least one hydroxyl group [monomers V],
f) no or one or more polyamines having at least two >N—H groups [monomers VI],
g) no or one or more compounds having at least one alcoholic OH group and at least one >N—H group [monomers VII] and
h) no or one or more monohydric polyetheralcohols [monomers VIII], with the proviso that the amounts of the incorporated monomers I to VIII are such that the (—OH+>N—H)/NCO equivalent ratios for the incorporated

| | |
|---|---|
| monomers III/monomers I + II | are from 0.1 to 0.75, |
| monomers IV/monomers I + II | are from 0.2 to 0.8, |
| monomers V/monomers I + II | are from 0.05 to 0.5, |
| monomers VI/monomers I + II | are from 0 to 0.4, |
| monomers VII/monomers I + II | are from 0 to 0.4, |
| monomers VIII/monomers I + II | are from 0 to 0.2 and | those for the sum of the monomers III to VIII/monomers (I+II) are from 0.80 to 1.25, the total amount of monomers I and monomers II contains from 50 to 100 mol % of monomers I and from 50 to 2 000 mmol of the carboxyl groups of the incorporated monomers V per kilogram of polyurethane A are present in neutralized form in the aqueous formulation.

The present invention also relates to a process for the preparation of these formulations as coating materials, in particular for coatings which have low gloss and low polishability.

Suitable monomers I whose organic skeleton has no lateral alkyl group are mono-, di- or polyisocyanates or mixtures thereof, preferably the aliphatic diisocyanates hexamethylene diisocyanate and 4,4'-diisocyanatodicyclohexylmethane.

Suitable monomers II whose organic skeleton has at least one lateral alkyl group are mono-, di- or polyisocyanates or mixtures thereof, preferably isocyanates such as trimethylhexane diisocyanate, 1-isocyanato-3,3,5-trimethyl-5-isocyanatomethyl-cyclohexane (IPDI), 2,4-diisocyanatotoluene, 2,6-diisocyanatotoluene, tetramethylxylylene diisocyanates, and polyisocyanates derived therefrom and having carbodiimide, allophanate, isocyanurate, urethane or biuret groups. Diisocyanates are preferred, among which the aliphatic diisocyanates, in particular 1-isocyanato-3,3,5-trimethyl-5-isocyanatomethylcyclohexane and the trimethylhexane diisocyanates are particularly preferred. The lateral alkyl groups of the monomers II preferably contain 1 to 3 carbon atoms, particularly preferably 1 carbon atom, per lateral alkyl group.

If monoisocyanates are concomitantly used in the case of the monomers I or II, the amount of monoisocyanates is preferably such that they contribute in each case not more than 10 mol % of isocyanate groups to the total amount of the isocyanate groups within the monomers I or II. Advantageously, both the monomers I and the monomers II have an average NCO functionality of 2. Monomer mixtures I and/or II which are composed exclusively of diisocyanates are particularly advantageous. Furthermore, the total amount of monomers I and II preferably contains from 50 to 100, particularly preferably from 70 to 100, very particularly preferably from more than 90 up to and including 100, in particular from 95 to 100, exceptionally preferably 100, mol % of monomers I.

Suitable monomers III are in particular dihydric or polyhydric polyesterpolyols and polyetherpolyols, the dihydric ones being preferred. Particularly suitable polyesterpolyols are the conventional reaction products of polyhydric alcohols with polybasic carboxylic acids, the alcoholic component being used in excess. The polybasic carboxylic acids may be aliphatic, cycloaliphatic, aromatic, heterocyclic or ethylenically unsaturated and, if required, may carry halogen atoms as substituents. Instead of the polybasic carboxylic acids, their anhydrides may also be esterified. Examples of suitable polybasic starting carboxylic acids are succinic acid, adipic acid, sebacic acid, phthalic acid, isophthalic acid, trimellitic acid, phthalic anhydride, tetrahydrophthalic anhydride, hexahydrophthalic anhydride, tetrachlorophthalic anhydride, endomethylenetetrahydrophthalic anhydride, glutaric anhydride, maleic acid, maleic anhydride or fumaric acid. The following may be mentioned as polyhydric alcohols to be used in excess:

1,2-ethanediol, 1,2-propanediol, 1,3-propanediol, 1,2-butanediol, 1,3-butanediol, 1,4-butanediol, 1,4-butenediol, 1,4-butynediol, 1,5-pentanediol and its positional isomers, 1,6-hexanediol, 1,8-octanediol, 1,4-bishydroxymethylcyclohexane, 2,2-bis(4-hydroxycyclohexyl)propane, 2-methyl-1,3-propanediol, glycerol, trimethylolpropane, trimethylolethane, 1,2,6-hexanetriol, 1,2,4-butanetriol, diethylene glycol, triethylene glycol, tetraethylene glycol, polyethylene glycol having a molar mass of from 378 to 900, preferably from 378 to 678, poly-1,2-propylene glycol or poly-1,3-propanediol having a molar mass of from 134 to 1 178, preferably from 134 to 888, polytetrahydrofuran having a molar mass of from 162 to 2 000, preferably from 378 to 1 458, particularly preferably from 378 to 678.

Polyesterpolyols obtained from diols and dicarboxylic acids are preferred. Other suitable polyesterpolyols are the adducts of lactones or lactone mixtures with dihydric alcohols used as initiator molecules. Examples of preferred lactones are ε-caprolactone, β-propiolactone, γ-butyrolactone and methyl-ε-caprolactone.

Suitable initiator molecules are in particular the low molecular weight dihydric alcohols mentioned above as components for the polyesterpolyols.

Polyesters obtained from hydroxycarboxylic acids are of course also suitable as monomers III. Furthermore, polycarbonates, as obtainable, for example, from phosgene or diphenyl carbonate and an excess of the low molecular weight dihydric alcohols mentioned as components for the polyesterpolyols, are also monomers III suitable as polyesters.

Preferred monomers III suitable as polyetherpolyols are polyetherdiols, as obtainable, for example, by boron trifluoride-catalyzed linkage of ethylene oxide, propylene oxide, butylene oxide, tetrahydrofuran, styrene oxide or epichlorohydrin with themselves or with one another, or by an addition reaction of these compounds, individually or as a mixture, with initiator components having reactive hydrogen atoms, such as water, polyhydric alcohols or amines, such as 1,2-ethanediol, 1,3-propanediol, 1,2- or 2,2-bis(4-hydroxyphenyl)propane or aniline. Furthermore, polyether-1,3-diols, for example trimethylolpropane which is alkoxylated at an OH group and whose alkylene oxide chain is terminated by an alkyl radical of 1 to 18 carbon atoms, are preferably used as monomers III.

Monomers IV may be dihydric or polyhydric alcohols, among which the dihydric ones are preferred.

Suitable monomers IV include the low molecular weight polyols mentioned as components for the polyesterpolyols III and polyhydric alcohols, such as trimethylolbutane, trimethylolpropane, trimethylolethane, neopentylglycol, neopentylglycol hydroxypivalate, pentaerythritol, 2-ethyl-1,3-propanediol, 2-methyl-1,3-propanediol, 2-ethyl-1,3-hexanediol, glycerol, ditrimethylolpropane, dipentaerythritol, hydroquinone, bisphenol A, bisphenol F, bisphenol B, bisphenol S, 2,2-bis(4-hydroxycyclohexyl)propane, 1,1-, 1,2-, 1,3- and 1,4-cyclohexanedimethanol, 1,2-, 1,3- or 1,4-cyclohexanediol or sugar alcohols, such as sorbitol, mannitol, diglycerol, threitol, erythritol, adonitol (ribitol), arabitol (lyxitol), xylitol, dulcitol (galactitol), maltitol or isomaltitol. Preferably linear 1,ω-dihydroxyalkanes, particularly preferably 1,4-butanediol and 1,6-hexanediol, are incorporated into polyurethane A. Particularly preferably, both the monomers III and the monomers IV consist exclusively of dihydric alcohols. Advantageously, the amounts of the monomers III and IV incorporated into the at least one polyurethane A are such that the molar ratio of their alcoholic —OH groups (IV:III) is from 1 to 8, preferably from 2 to 6.

Carboxylic acids having at least one hydroxyl group (—OH) [monomer V] are those compounds which contain at least one carboxyl function (—COOH), preferably from one to three, particularly preferably one or two, carboxyl functions (—COOH), very particularly preferably one carboxyl function (—COOH), or the anionic forms thereof, with which any desired opposite ion or a plurality thereof may be associated, e.g. $Li^+$, $Na^+$, $K^+$, $Cs^+$, $Mg^{2+}$, $Ca^{2+}$ or $Ba^{2+}$. Furthermore, the ammonium ions or quaternary ammonium ions derived from ammonia or amines, in particular tertiary amines, e.g. ammonium, methylammonium, dimethylammonium, trimethylammonium, ethylammonium, diethylammonium, triethylammonium, tributylammonium, diisopropylethylammonium, benzyldimethylammonium, monoethanolammonium, diethanolammonium, triethanolammonium, hydroxyethyldimethylammonium, hydroxyethyldiethylammonium, monopropanolammonium, dipropanolammonium, tripropanolammonium, piperidinium, piperazinium, N,N'-dimethylpiperazinium, morpholinium, pyridinium, tetramethylammonium, triethylmethylammonium, 2-hydroxyethyltrimethylammonium, bis(2-hydroxyethyl)dimethylammonium or tris(2-hydroxyethyl)methylammonium, may be associated as an opposite ion.

A preferred opposite ion is ammonium. If a plurality of different opposite ions are present, the amount of ammonium ions among these is preferably from 50 to 100, particularly preferably 75–100, very particularly preferably 90–100, in particular 100, mol %.

The carboxylic acids having at least one hydroxyl group may be aliphatic, cycloaliphatic or aromatic, branched or straight-chain and unsubstituted or substituted.

Particularly preferred monomers V are of 2 to 6, very particularly preferably 3 to 5, in particular 4 or 5, carbon atoms.

Examples of monomers V are hydroxyacetic acid, tartaric acid, lactic acid, 3-hydroxypropionic acid, dimethylolpropionic acid, dimethylolbutyric acid, trimethylolacetic acid, hydroxypivalic acid or sugar acids, such as gluconic acid, glucaric acid, glucuronic acid, galacturonic acid or mucic acid (galactaric acid), preferably lactic acid, dimethylolpropionic acid, dimethylolbutyric acid, trimethylolacetic acid, hydroxypivalic acid and glucuronic acid, particularly preferably lactic acid and dimethylolpropionic acid, very particularly preferably dimethylolpropionic acid.

The monomers V may also be used in the form of a mixture.

The novel polyurethane formulations preferably contain polyurethanes A in which from 70 to 1 000, particularly preferably from 100 to 700, mmol of the carboxyl groups of the incorporated monomers V per kilogram of polyurethane A are present in ionized form, i.e. in the anionic form, in the aqueous formulation.

The monomers VI preferably have a molecular weight of from 32 to 500, particularly preferably from 60 to 300. They are exclusively polyamines which have no tertiary amino groups. Examples of suitable monomers VI are diamines, such as 1,2-diaminoethane, 1,6-diaminohexane, piperazine, 2,5-dimethylpiperazine, 1-amino-3-aminomethyl-3,5,5-trimethylcyclohexane (IPDA), 4,4'-di(aminocyclohexyl)methane, 1,4-diaminocyclohexane, 1,2- and 1,3-diaminopropane, hydrazine, hydrazine hydrate, triamines, such as diethylenetriamine, or tetramines, such as N,N-bis(3-aminopropyl)-1,4-diaminobutane. However, other suitable monomers VI are ketimines, as described in DE-B 27 25 589, ketazines, such as those of DE-B 28 11 148 and of U.S. Pat. No. 4,269,748, amine salts, such as those in U.S. Pat. No. 4,292,226, or oxazolidines, as described in DE-B 27 32 131 and U.S. Pat. No. 4,192,937. These are masked polyamines from which the corresponding polyamines are liberated as intermediates in the presence of water.

Preferably used monomers VI are ethylenediamine, 1-amino-3-aminomethyl-3,5,5-trimethylcyclohexane (IPDA) and 4,4'-di(aminocyclohexyl)methane, and 1-amino-3-aminomethyl-3,5,5-trimethylcyclohexane (IPDA) is particularly preferably used.

According to the invention, the (—OH+>N—H)/NCO equivalent ratio for the monomers VI/(I+II) used is from 0 to 0.4, preferably from 0 to 0.2, particularly preferably from 0.02 to 0.2.

Particularly suitable monomers VII are aminoalcohols, such as ethanolamine, isopropanolamine, methylethanolamine and aminoethoxyethanol.

The monomers VIII preferably have a number average molecular weight of from 500 to 10 000, particularly preferably from 1 000 to 5 000. They are usually obtainable by alkoxylation of low molecular weight monofunctional initiator molecules, such as methanol, ethanol or n-butanol, the alkoxylating agent used preferably being ethylene oxide or a mixture of ethylene oxide with other alkylene oxides, in particular propylene oxide. In the case of alkoxylation with alkylene oxide mixtures, these advantageously contain at least 40, particularly advantageously at least 65, mol % of ethylene oxide. The amount of the monomers VIII should expediently not exceed 10% by weight, based on the total weight of the incorporated monomers.

Further examples of monomers I to VIII suitable for the synthesis of the polyurethanes A are described, for example, in-High Polymers, Vol. XVI, Polyurethanes, Chemistry and Technology, Interscience Publishers, New York, Vol. 1, 1962, pages 32 to 42, pages 44 to 54, and Vol. II, 1964, pages 5 to 6 and pages 198 to 199. The polyurethanes A preferably contain, as incorporated units, only those monomers I to VIII which have two isocyanate groups or two groups reactive with isocyanate groups. The monomers I to VIII are advantageously incorporated into the at least one polyurethane A in amounts such that the total number of isocyanate groups is matched by a roughly equivalent total number of hydroxyl and amino groups reactive with isocyanate groups. The equivalent ratio is preferably from 0.9 to 1.11, particularly preferably from 0.95 to 1.05.

The novel aqueous polyurethane formulations are expediently prepared by reacting the monomers I to V and, if required, the monomers VII and VIII in the melt or in the presence of an inert, water-miscible solvent, such as acetone, tetrahydrofuran, butanone, diethyl ketone, a cyclic or open-chain carbonate or N-methylpyrrolidone, at from 20 to 160° C., preferably from 50 to 100° C., the duration of the reaction usually being from 2 to 10 hours. The reaction can be accelerated by the presence of substances which are catalytically active in a manner known per se, such as dibutyltin dilaurate, tin(II) octanoate or 1,4-diazabicyclo[2.2.2]octane, usually in amounts of from 10 to 100 ppm, based on the solvent-free reaction mixture. Thereafter, dilution is effected, if required, with a water-miscible solvent, ionogenic groups of the monomers V are, if required, ionized by neutralization, water is added and, if required, the monomers VI are stirred in. Any organic solvents present are then usually distilled off, and it is for this reason that solvents whose boiling point is below the boiling point of water are preferred. If monomers VI are also incorporated into the polyurethane A, they are added to the aqueous reaction mixture containing the polyurethane composed of the remaining monomers preferably by stirring in at from 20 to 50° C. If required, the monomers VI can also be added before the dispersing with water.

The amount of water added is usually such that the novel aqueous polyurethane formulations have a solids content of from 10 to 80% by weight. Apart from typical components insoluble in N,N-dimethylformamide (DMF), the polyurethanes contained in the formulations generally have a K value of from 20 to 80 in DMF. The K value is a relative viscosity number which is determined analogously to DIN 53 726 at 23° C. It comprises the flow rate of a 1% strength by weight solution of-the polyurethane in DMF, relative to the flow rate of pure DMF, and characterizes the average molecular weight of the polyurethane.

In the preparation of aqueous polyurethane dispersions, the addition reaction, i.e. the reaction of the individual monomers with one another, is frequently carried out with the use of catalysts. Organic compounds of tin, for example dibutyltin dilaurate or tin(II) octanoate, have proven particularly useful here. However, it is known that such organic compounds of tin have, inter alia, high toxicity and, owing to their poor degradability, accumulate in the environment in an undesired manner. Although the diorganyl compounds of tin which are usually used are less hazardous than the triorganyl compounds of tin, commercial preparations of diorganyl compounds of tin always also contain certain amounts of triorganyl compounds of tin, owing to the special preparation. Alternatively, other organometallic compounds, i.e. those having at least one covalent metal-carbon bond, are also used as catalysts, for example bismuth organyls.

According to the invention, catalysis by any metal organyls is preferably dispensed with.

The polyaddition of the abovementioned monomers for the preparation of the novel polyurethane formulation can be particularly preferably carried out in the presence of cesium salts, as described in the prior German Patent Application with the application number 10161156.0 of 12.12.2001. Preferred cesium salts are compounds in which the following anions are used: $F^-$, $Cl^-$, $ClO^-$, $ClO_3^-$, $ClO_4^-$, $Br^-$, $J^-$, $JO_3^-$, $CN^-$, $OCN^-$, $NO_2^-$, $NO_3^-$, $HCO_3^-$, $CO_3^{2-}$, $S^{2-}$, $SH^-$, $HSO_3^-$, $SO_3^{2-}$, $HSO_4^-$, $SO_4^{2-}$, $S_2O_2^{2-}$, $S_2O_4^{2-}$, $S_2O_5^{2-}$, $S_2O_6^{2-}$, $S_2O_7^{2-}$, $S_2O_8^{2-}$, $H_2PO_2^-$, $H_2PO_4^-$, $HPO_4^{2-}$, $PO_4^{3-}$, $P_2O_7^{4-}$, $(OC_nH_{2n+1})^-$, $(C_nH_{2n-1}O_2)^-$, $(C_nH_{2n-3}O_2)^-$ and $(C_{n+1}H_{2n-2}O_4)^{2-}$, where n is from 1 to 20.

Particularly preferred cesium carboxylates are those in which the anion is of the formulae $(C_nH_{2n-1}O_2)^-$ and $(C_{n+1}H_{2n-2}O_4)^{2-}$, where n is from 1 to 20. Very particularly preferred cesium salts have, as anions, monocarboxylates of the formula $(C_nH_{2n-1}O_2)^-$, where n is from 1 to 20. Formate, acetate, propionate, hexanoate and 2-ethylhexanoate may be mentioned in particular here.

The cesium salts are used in amounts of from 0.01 to 10, preferably from 0.05 to 2, mmol of cesium salt per kg of solvent-free batch.

The cesium salts may be added to the batch in solid form, but preferably in dissolved form. Suitable solvents are polar, aprotic solvents or protic solvents. In addition to water, alcohols are also particularly suitable; polyols as otherwise used as building blocks for polyurethanes are very particularly suitable, e.g. ethane-, propane- and butanediols. The use of the cesium salts makes it possible to carry out the polyaddition under the conventional conditions.

After the reaction to give the polymer, neutralization to the abovementioned degree of neutralization is preferably effected, analogously to the method as described in the prior German Patent Application with application number 10127208.1 of 6.5.2001. Ammonia is particularly suitable for this purpose.

The content of $COO^- NH_4^+$ after the neutralization should be, for example, from 50 to 2 000, preferably from 100 to 600, particularly preferably from 200 to 500, very particularly preferably from 250 to 500, mmol/kg.

After the neutralization, dispersing is then effected with water and any solvent is distilled off. As a result of the addition of water and the subsequent removal of the solvent by distillation, in particular the desired solids concentration can be established.

Because of the particular choice of the raw materials and their ratios, the novel polyurethane formulations contain particles which are insoluble in the polyurethane matrix and whose mean diameter is from 1 to 20 µm, particularly preferably 2–15 µm, very particularly preferably 3–100 µm, in particular from 3 to 7 µm.

Aqueous polyurethane dispersions which contain particles having larger particle diameters are not stable and have a raw handle on leather; smaller particle diameters exhibit no matting effect.

The polyurethane dispersions may contain commercial assistants and additives, such as blowing agents, antifoams, emulsifiers, thickeners, crosslinking agents, thixotropic agents and colorants, such as dyes and pigments.

The novel aqueous polyurethane formulations can advantageously be used as binders for coating materials if, for technical or aesthetic reasons, coatings having reduced surface gloss are desired. Suitable substrates are textiles, leather, metal, plastic, glass, wood, paper or board, and preferred substrates are textiles and leather, particularly preferably leather. Remarkably, the coatings obtainable with the use of the novel aqueous polyurethane formulations as binders have high abrasion resistance, water resistance and resilience, low polishability, good color depth and a pleasant, warm, soft (fatty) handle, in addition to reduced gloss. The novel aqueous polyurethane formulations can therefore particularly advantageously be used as binders for sealing coats on leathers which may have been pretreated with commercial bottoming agents, in particular automotive leather and upholstery leather. The novel aqueous formulations can be used by themselves or as a mixture with other binders and conventional assistants. By mixing with other binders, for example other polyurethane dispersions, the gloss can be brought to a desired level. Said formulations can be applied to these articles by atomization, spraying, casting, knife coating, impregnation or in the form of a film and then dried. The novel aqueous formulations are expediently applied with a solids content of from 10 to 75, preferably from 20 to 65, % by weight and a viscosity of from 10 to 1 500 mPa·s (measured at 20° C. and a shear rate of 250 $s^{-1}$).

The use of the novel aqueous polyurethane formulations as binders in bottoming coats is also possible.

The coatings obtainable with the novel polyurethane formulations have low polishability and a pleasant, warm, soft (fatty) handle.

In this document, ppm data and percentages used are by weight, unless stated otherwise.

EXAMPLES

Comparative Example

A mixture of 394 kg of a polyesterdiol obtained from adipic acid, neopentylglycol and 1,6-hexanediol (hydroxyl number 56 according to DIN 53 240), 90 kg of 1,4-butanediol, 0.1 kg of dibutyltin dilaurate, 72.5 kg of 1-isocyanato-3,3,5-trimethyl-5-isocyanatomethylcyclohexane and 258.2 kg of 4,4'-diisocyanatodicyclohexylmethane was reacted for 3 hours at 70° C. Dilution was then effected with 1 000 kg of acetone and the mixture was cooled to 50° C. 48 kg of a 40% strength by weight aqueous solution of the sodium salt of N-(2-aminoethyl)-2-aminoethanecarboxylic acid and 1 250 kg of water were then stirred in at 50° C. After removal of the acetone by distillation, an about 40% strength by weight aqueous polyurethane formulation was obtained.

After storage for four weeks, the dispersion had a thick sediment which could not be homogeneously distributed again by shaking or stirring.

1. Preparation of a Novel Polyurethane Formulation

Z1:

In a stirred flask having a reflux condenser and thermometer, 400 g (0.20 mol) of polytetrahydrofuran having an OH number of 56, 40.2 g (0.30 mol) of dimethylolpropionic acid and 100 g of butanone were brought to 80° C. while stirring. 168 g (1.00 mol) of hexamethylene diisocyanate (HDI) were added to this all at once. After 15 minutes, 47.2 g (0.40 mol) of 1,6-hexanediol heated to 45° C. were added to the batch. After 15 minutes, 70 g of acetone were added and stirring was carried out for a further 200 minutes at 80° C. During this procedure, the increasing viscosity was reduced by gradually adding first a total of 200 g of butanone and then a total of 200 g of acetone. 210 minutes after the addition of the hexanediol, dilution was effected with a further 500 g of acetone and the mixture was cooled to 30° C. The NCO content of the dilute solution was determined as 0.49% by weight (calculated: 0.49% by weight). Thereafter, 17.0 g (0.1 mol) of isophoronediamine (IPDA) were added and stirring was carried out for 60 minutes at 30° C. After the addition of a solution of 18 g of 25% strength aqueous ammonia in 80 g of water, dispersion was effected by adding 1 300 g of water, and acetone and butanone were distilled off under reduced pressure.

An aqueous polyurethane dispersion having a solids content of 33% was obtained.

Even on storage for four weeks, the dispersion had only a little sediment, which could be readily homogeneously distributed again by shaking or stirring.

A thin film applied to a microscope slide showed, under an optical microscope, particles whose mean diameter was measured as about 6 µm.

2. Use of the Novel PUD as Binders for Coatings a) An automotive leather crust was bottomed with a commercial bottom consisting of 250 g of water, 150 g of Lepton® Schwarz N (BASF AG, Ludwigshafen), 100 g of Luron® Mattierung (BASF AG, Ludwigshafen), 50 g of Lepton® Filler CEN (BASF AG, Ludwigshafen), 50 g of Lepton Mattierung MF (BASF AG, Ludwigshafen), 100 g of Corialgrund® DN (BASF AG, Ludwigshafen), 250 g of Astacin® Finish PUMN TF (BASF AG, Ludwigshafen) and 50 g of Astacin® Finish PFM TF (BASF AG, Ludwigshafen)

(amount applied: 1 cross in spray application), dried, embossed at 80° C. under 200 bar for 1.5 s and milled for 3 hours.

A mixture of 300 g of water, 150 g of Lepton® Schwarz N (BASF AG, Ludwigshafen), 100 g of Luron Mattierung (BASF AG, Ludwigshafen), 50 g of Lepton® Filler CEN (BASF AG, Ludwigshafen), 50 g of Lepton Mattierung MF (BASF AG, Ludwigshafen), 100 g of Corialgrund® DN (BASF AG, Ludwigshafen), 250 g of Astacin® Finish PUMN TF (BASF AG, Ludwigshafen), 100 g of Astacin® Finish PFM TF (BASF AG, Ludwigshafen) and 30 g of Astacin® Härter CN (BASF AG, Ludwigshafen) was applied as a top coat by spray coating (amount applied: 1 cross).

A mixture of 380 g of water, 10 g of Lepton® Schwarz N (BASF AG, Ludwigshafen), 40 g of Lepton® Wachs WA (BASF AG, Ludwigshafen), 60 g of Astacin® Härter CN (BASF AG, Ludwigshafen) and 500 g of Z1 (BASF AG, Ludwigshafen), for which the viscosity had been brought by means of Lepton® Paste VL (BASF AG, Ludwigshafen) to an efflux time of 25 s in a 4 mm DIN cup at 23° C. according to DIN 53211, was then applied by spray coating (amount applied: 2 crosses, intermediate drying and final drying at 80° C. in a drying tunnel).

Rubfastness according to IUF 450 (DIN EN ISO 11640), wet leather: no damage after 500 cycles, rubfastness according to IUF 450, dry leather: no damage after 2 000 cycles swelling resistance, dry felt according to IUF 450: no damage after 2 000 cycles fastness to rubbing with gasoline according to IUF 450: no damage and no discoloration after 10 rubs flex resistance according to IUP20 (DIN EN 13334):
dry leather: no damage after 100 000 cycles
wet leather: no damage after 20 000 cycles
at −10° C.: no damage after 30 000 cycles
Taber Test CS 10 (1 000 g load) (DIN 53109): no damage after 1 000 cycles Visual inspection showed no polishability at all after 2 000 dry rubs.

b) An automotive leather crust was bottomed with a commercial bottom consisting of 350 g of water, 120 g of Lepton® Schwarz N, 200 g of Lepton® Filler CEN, 250 g of Corialgrund® BAN and 150 g of Astacin® Finish SUSI TF (amount applied: 20 g of dry material/m$^2$).

A mixture of 157 g of water, 3 g of Lepton® Wachs WA, 18 g of Astacin® Härter CN and 122 g of Z1 was then applied (2 g wet/DIN A4) and dried at 80° C. for 5 minutes in a through-circulation dryer, and the same amount of the mixture was applied again and dried again.

A coated leather having the following properties was obtained:

Gloss 20°:0.1 60°:0.5 85°:0.4
measured using a REFO 3D gloss meter from Lange, according to the operating instructions.

In order to assess the polishability, the gloss of the rub mark according to IUF 450 was measured after 2 000 cycles on dry leather.

Gloss after 2 000 rubs: 60°:0.5 85°:0.6

As can be seen, the novel polyurethane formulation was very suitable for coating leather, not only with regard to the mechanical properties but also in respect of polishability.

Extremely matt, nonpolishable finishes having excellent jetness can be achieved.

The invention claimed is:

1. A matt finished leather coated with an aqueous polyurethane formulation comprising from 10 to 60%, by weight, of at least one polyurethane A, which is composed of
    a) at least one organic isocyanate having no lateral alkyl groups [monomers I],
    b) optionally at least one organic isocyanate having at least one lateral alkyl group [monomers II],
    c) at least one dihydric or polyhydric alcohol having a number average molecular weight of from 400 to 6000 [monomers III],
    d) at least one dihydric or polyhydric alcohol having a number average molecular weight of from 62 to 399 [monomers IV],
    e) at least one carboxylic acid having at least one hydroxyl group [monomers V],
    f) optionally one or more polyamines having at least two >N—H groups [monomers VI],
    g) optionally one or more compounds having at least one alcoholic OH group and at least one >N—H group [monomers VII] and
    h) optionally one or more monohydric polyetheralcohols [monomers VIII],
    with the proviso that the amounts of the incorporated monomers I to VIII are such that the (—OH+>N—H)/NCO equivalent ratios for the incorporated
    monomers III/monomers I+II are from 0.1 to 0.75,
    monomers IV/monomers I+II are from 0.2 to 0.8,
    monomers V/monomers I+II are from 0.05 to 0.5,
    monomers VI/monomers I+II are from 0 to 0.4,
    monomers VII/monomers I+II are from 0 to 0.4,
    monomers VIII/ monomers I+II are from 0 to 0.2, and
    those for the sum of the monomers III to VIII/monomers (I+II) are from 0.80 to 1.25, the total amount of monomers I and monomers II contains from 50 to 100 mol % of monomers I, and from 50 to 2000 mmol of the carboxyl groups of the incorporated monomers V, per kilogram of polyurethane A, are present in anionic form in the aqueous formulation, and the dispersed polyurethane particles have a particle size from 2–15 µm.

2. A method of matting leather, comprising applying an aqueous polyurethane formulation comprising from 10 to 60%, by weight, of at least one polyurethane A, which is composed of
    a) at least one organic isocyanate having no lateral alkyl groups [monomers I],
    b) optionally at least one organic isocyanate having at least one lateral alkyl group [monomers II],
    c) at least one dihydric or polyhydric alcohol having a number average molecular weight of from 400 to 6000 [monomers III],
    d) at least one dihydric or polyhydric alcohol having a number average molecular weight of from 62 to 399 [monomers IV],
    e) at least one carboxylic acid having at least one hydroxyl group [monomers V],
    f) optionally one or more polyamines having at least two >N—H groups [monomers VI],
    g) optionally one or more compounds having at least one alcoholic OH group and at least one >N—H group [monomers VII] and h) optionally one or more monohydric polyetheralcohols [monomers VIII], with the proviso that the amounts of the incorporated monomers I to VIII are such that the (—OH+>N—H)/NCO equivalent ratios for the incorporated monomers III/monomers I+II are from 0.1 to 0.75,
monomers IV/monomers I+II are from 0.2 to 0.8,
monomers V/monomers I+II are from 0.05 to 0.5,
monomers VI/monomers I+II are from 0 to 0.4,
monomers VII/monomers I+II are from 0 to 0.4,
monomers VIII/monomers I+II are from 0 to 0.2, and
those for the sum of the monomers III to VIII/monomers (I+II) are from 0.80 to 1.25, the total amount of monomers I and monomers II contains from 50 to 100 mol % of monomers I, and from 50 to 2000 mmol of the carboxyl groups of the incorporated monomers V, per kilogram of polyurethane A, are present in anionic form in the aqueous formulation, and the dispersed polyurethane particles have a particle size from 2–15 μm, to a leather.

3. The matt finished leather as claimed in claim 1, wherein the monomer I is selected from the group consisting of hexamethylene diisocyanate (HDI) and 4,4'-diisocyanatodicyclohexylmethane.

4. The matt finished leather as claimed in claim 1, wherein the total amount of monomers I and II contains from more than 90, up to, and including, 100 mol % of monomers I.

5. The matt finished leather as claimed in claim 1, wherein the monomer V is selected from the group consisting of lactic acid, dimethylolpropionic acid, dimethylolbutyric acid, trimethylolacetic acid, hydroxypivalic acid and glucuronic acid.

6. The matt finished leather as claimed in claim 1, wherein the monomer V is selected from the group consisting of lactic acid and dimethylolpropionic acid.

7. The matt finished leather as claimed in claim 1, wherein the monomer V is dimethylolpropionic acid.

8. The matt finished leather as claimed in claim 1, wherein the monomer VI is selected from the group consisting of ethylenediamine, 1-amino-3-aminomethyl-3,5,5-trimethylcyclohexane and 4,4'-di(aminocyclohexyl)methane.

9. The matt finished leather as claimed in claim 1, wherein the monomer VI is 1-amino-3-aminomethyl-3,5,5-trimethylcyclohexane.

10. The matt finished leather as claimed in claim 1, wherein the >N—H/NCO equivalent ratio for the monomers VI/monomers (I+II) is from 0.02 to 0.4.

11. The matt finished leather as claimed in claim 1, wherein ammonium $NH_4^{3\ominus}$ is present as the opposite ion of the carboxyl groups of the incorporated monomers V.

12. The matt finished leather as claimed in claim 1, wherein the reaction of the monomers, is carried out in the absence of metal organyls.

13. The matt finished leather as claimed in claim 1, obtained by reacting the monomers in the presence of a cesium salt.

14. The matt finished leather as claimed in claim 3, wherein the total amount of monomers I and II contains from more than 90, up to, and including, 100 mol % of monomers I.

15. The matt finished leather as claimed in claim 3, wherein the monomer V is selected from the group consisting of lactic acid, dimethylolpropionic acid, dimethylolbutyric acid, trimethylolacetic acid, hydroxypivalic acid and glucuronic acid.

16. The matt finished leather as claimed in claim 4, wherein the monomer V is selected from the group consisting of lactic acid, dimethylolpropionic acid, dimethylolbutyric acid, trimethylolacetic acid, hydroxypivalic acid and glucuronic acid.

17. The matt finished leather as claimed in claim 3, wherein the monomer VI is selected from the group consisting of ethylenediamine, 1-amino-3-aminomethyl-3,5,5-trimethylcyclohexane and 4,4'-di(aminocyclohexyl)methane.

18. The matt finished leather as claimed in claim 5, wherein the monomer VI is selected from the group consisting of ethylenediamine, 1-amino-3-aminomethyl-3,5,5-trimethylcyclohexane and 4,4'-di(aminocyclohexyl)methane.

* * * * *